(12) United States Patent
Chaboud et al.

(10) Patent No.: US 10,079,885 B1
(45) Date of Patent: Sep. 18, 2018

(54) MULTI-CHANNEL DISTRIBUTED PREDICTIVE EDGE CACHE

(71) Applicant: Amazon Technologies, Inc., Reno, NV (US)

(72) Inventors: Matthew Liang Chaboud, San Francisco, CA (US); Richard Kevin Cacioppo, Jr., Luxembourg (LU); Ryan Hastings Cassidy, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 653 days.

(21) Appl. No.: 14/488,471

(22) Filed: Sep. 17, 2014

(51) Int. Cl.
*G06F 15/167* (2006.01)
*H04L 29/08* (2006.01)
*G06F 12/084* (2016.01)

(52) U.S. Cl.
CPC ........ *H04L 67/1097* (2013.01); *G06F 12/084* (2013.01)

(58) Field of Classification Search
CPC ........................... H04L 67/1097; G06F 12/084
USPC ........................................................ 709/213
See application file for complete search history.

(56) References Cited

U.S. PATENT DOCUMENTS

| | | | | |
|---|---|---|---|---|
| 8,312,660 B1 * | 11/2012 | Fujisaki | ................... | F41A 17/08 42/70.01 |
| 2010/0306252 A1 * | 12/2010 | Jarvis | ................ | G06F 17/30132 707/770 |
| 2012/0094635 A1 * | 4/2012 | Ananthanarayanan | ....................... | H04W 12/04 455/411 |
| 2012/0254619 A1 * | 10/2012 | Dhuse | ..................... | H04L 9/085 713/176 |
| 2012/0324589 A1 * | 12/2012 | Nukala | ............... | H04L 67/1097 726/28 |
| 2015/0039620 A1 * | 2/2015 | Ning | ................. | G06F 17/30053 707/740 |

OTHER PUBLICATIONS

Webb, Can Existing Wi-Fi nodes boost 4G?, E & T Magazine, vol. 6, Issue 12, Dec. 2011.
Integration of Cellular and Wi-Fi Networks, 4G Americas, Sep. 2013.

* cited by examiner

*Primary Examiner* — S M Rahman
(74) *Attorney, Agent, or Firm* — Pierce Atwood LLP

(57) ABSTRACT

A system for distributing data to a user's device leveraging locally shared cache and multiple communication pathways. A content server of the system may pre-cache content in the shared cache in anticipation that a user will want to access the content. Among other things, pre-caching enables a user to access content on-demand that would require a faster connection to the Internet than the user may have. The system can leverage different communications pathways to the various devices utilizing the shared cache, providing timely delivery of content even if each device's individual connection to the internet is too slow to support timely delivery.

19 Claims, 8 Drawing Sheets

MULTI-CHANNEL DISTRIBUTED PREDICTIVE EDGE CACHE

BACKGROUND

Mobile electronic devices such as smart phones and tablet computers support communications across a variety of wireless radio access technologies. In addition to communicating with networks such as the Internet and cellular data telephony networks, many devices support some form of wireless peer-to-peer communications.

BRIEF DESCRIPTION OF DRAWINGS

For a more complete understanding of the present disclosure, reference is now made to the following description taken in conjunction with the accompanying drawings.

DETAILED DESCRIPTION

Local wired and wireless networks available to devices are often much faster than the connections used to communicate with external "long-haul" networks such as the Internet. Ethernet and/or wireless local area network (WLAN) protocols such as WiFi (i.e., the IEEE 802.11 standards) allow the seamless storage and sharing of content between local devices, with speeds sufficiently fast that in many cases a user would not recognize that the media is not stored on the user's own device.

Among other things, contemporary WLAN networks achieve speeds that have popularized the use of wireless shared storage solutions, such as wirelessly-accessed network attached storage (NAS). A local NAS serves network-connected devices in much the same way as an internal or wired external hard drive, except that NAS storage may be shared among multiple users.

However, while local networks achieve such speeds, connections to external networks (e.g., the Internet) remain a communications bottleneck. In computer architecture, a similar bottleneck problem occurs when a microprocessor accesses main memory. The communication bus to main memory tends to be substantially slower than the speed of the microprocessor. To mitigate this bottleneck, microprocessors include a local "cache" that stores frequently used data. When a process needs data, the cache enables it to immediate access the data without the need to pull the data from main memory.

Network-based "cloud" storage solutions, which provide users with Internet-based storage, sometimes support local caching of data held in the "cloud" to reduce the impact of the Internet communications bottleneck. However, such solutions cache existing data based on past usage of that data, and are designed to cache data for-and-on a single target device.

Figure 1:
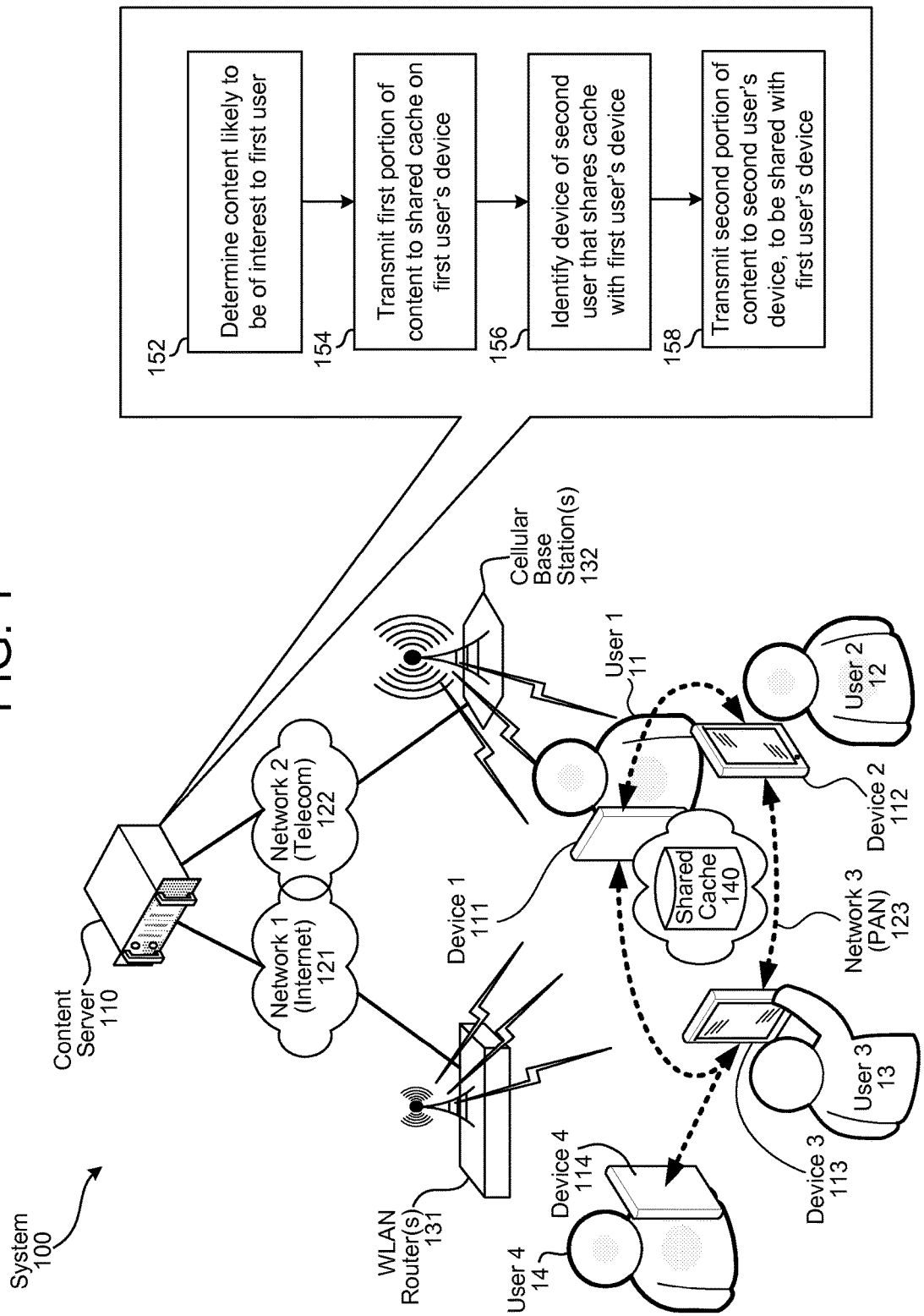
FIG. 1 illustrates a system for predictive distribution of media content, utilizing multiple networks and a distributed cache shared locally among peer devices.

FIG. 1 illustrates a system 100 for distributing data to a user's device leveraging locally shared cache and multiple communication pathways. The content server 110 of the system 100 may pre-cache content in a shared cache 140 in anticipation that a user will want to access the content. Among other things, pre-caching enables a user to access content on-demand that would require a faster connection to the Internet than the user may be able to use at the time the content is accessed. But moving beyond pre-caching, the system 100 can leverage different communications pathways to the various devices utilizing the shared cache 140, providing timely delivery of content even if each device's individual connection to the Internet is too slow to support timely delivery.

A content server 110 determines (152) content that is likely to be of interest to a first user 11. For example, a movie that is newly added to a streaming video library may be identified as something that will likely be of interest to the user 11. The content server 110 identifies the user's device (111), and may begin transmitting (154) a first portion of the content to the shared cache on the first user's device via one of several networks (e.g., the Internet 121 via a WLAN router 131, a cellular data network 122 via a cellular base station 132, etc.).

However, even with pre-caching this connection may be too slow to deliver the content to the first user's device 111 to have it ready by the time it is anticipated the first user 11 is likely to try to access the content (for example, based on a past pattern of content consumption and device usage). Therefore, to accelerate delivery, the content server may identify (156) a device 112 of a second user 12 that shares the cache 140 with the first user's device 111, and transmit (158) a second portion of the content to the shared cache 140 on the second user's device 112.

The shared cache 140 itself may be a distributed cache, broken up across the devices. Cache segments of the complete cache exist as memory and/or storage on the individual devices sharing the cache, with the combined segments forming the distributed shared cache 140. Thus the distributed cache may include storage portions allocated in a number of individual devices, where the storage portions are allocated for shared storage. For example, if the cache stores a video broken into three portions, a first portion may be stored in a cache segment on the first device 111, a second portion may be stored in a cache segment on the second device 112, and a third portion may be stored in a cache segment on the third device 113, such that the distributed cache 140 holds the complete video. Duplicate copies of content may exist in multiple cache segments, some cache segments may be empty or not contain any portion of content stored in other cache segments, and in some circumstances (e.g., due to retaining copies of shared cache content, discussed further below), the cache segments may hold identical contents.

In the alternative, instead of a distributed cache, the shared cache 140 may be a separate storage device on one or more local networks. The separate storage device serving as the shared cache may operate with authentication certificates or "tokens" in coordination with an authentication/tokening authority for third party or for derivative devices.

The content server 110 would pre-cache content to the separate storage device, and the user devices (e.g., 111, 112, 113, 114) would require a token or authentication key to access and/or consume the pre-cached content. The content server 110 may communicate directly with the separate storage device, or access it through the communication paths and/or "mesh" connections via the user devices.

A communication link between two devices "via" a network may span multiple networks. In other words, a communications link (e.g., a transmission) that travels from across multiple networks maybe characterized as being "via" any of the networks comprising the link.

The shared cache may also be realized as a combination of a distributed cache among one or more different user devices and a separate storage device. Arranged in combination with the user devices (e.g., 111-114), the separate storage device may operate in a similar manner to one of the user devices, with a portion (or all) of the storage of the separate storage device dedicated to the distributed cache. Multiple separate storage devices may also act together as part of the distributed cache (either alone or with one or more user devices).

Sharing content from the distributed cache may use one or more local networks, such as a WLAN (e.g., IEEE 802.11a/b/g/n/ac WiFi) and/or a peer-to-peer network such as a personal area network (PAN) 123. Sharing may be device-to-device, or via a "mesh" of devices where one device communicates with another via intervening devices. A single communications connection between two devices may traverse more than one network. For example, in FIG. 1, device 1 (111) may access shared cache content stored on user device 4 (114) by opening a WLAN connection to device 3 (113) (e.g., peer-to-peer or via WLAN router 131), which connects to device 4 (114) via the PAN (123). In some circumstances, connections between devices may include links on an external network (e.g., 121, 122 based on the number of hops, as will be described further below).

Although typically slower than WLAN, many devices support wireless personal area networks (PAN), with a range typically on an order of a few centimeters up to a few meters. Among other applications, PANs are used for device-to-device communications and home automation. Examples of PAN technologies include IrDA, wireless USB (universal serial bus), Bluetooth, Z-Wave (a home automation radio technology), ZigBee (i.e., the IEEE 802.15.4 standards), WiFi Direct (a peer-to-peer WiFi standard that enables devices to connect with each other without required a wireless access point), and other peer-to-peer WiFi-model variants. In comparison, a wireless local area network (WLAN) is typically used to provide access to a larger network, such as the Internet, with a range typically on an order of tens to hundreds of meters.

The peer devices may share topological awareness information, such as what local and external communications pathways are available, and what other peer devices are reachable, and that topological awareness information may be shared with the content server 110. Each peer device serves as a "node" on the local network. Connectivity within the local network may be disparate, with different devices having and sharing access to different nodes and networks. For example, in FIG. 1, device 1 (111) of the first user (11), device 2 (112) of the second user (12), and device 3 (113) of the third user (13) each have access to local WLAN router(s) 131, the first network (121), cellular base station(s) 132, the second network (122), and the third network (123). However, device 4 (114) of the fourth user (14) shares a PAN link (network 3) to device 3 (113) of the third user (13), but has no other open communication connections. Even so, device 4 (114) of the fourth user (14) exists as a node on the network, and is therefore connected to the other peer devices (111, 112, etc.) and the content server 110. Moreover, device 4 (114) of the fourth user (14) may access the shared cache 140, and may itself store a cache segments to be shared with directly connected (e.g., 113) and indirectly connected (e.g., 111, 112) peer devices.

When the first user 11 goes to consume the content, the user's device 111 will check the shared distributed cache 140 before attempting to pull down the content across one of the external long-haul networks (e.g., 121, 122). Among other techniques, this may include querying/polling other local devices (e.g., 112, 113, 114) to determine whether portions of the desired content is locally available. In addition or as an alternative to polling, the peer devices 111/112/113/114 may periodically share cache tables amongst themselves indicating what content has been added and what content has been purged from the distributed cache.

The determination as to whether content is available locally or must be obtained across the long-haul network may utilize a constraints-based weighted graph optimization scheme. A "graph" may be used as a model of the system 100, and comprises a set of "nodes," which in this case represent system elements such as the local devices (e.g., 112, 113, 114), the content server (110), and any other network-addressable storage device. Certain graph nodes are connected by "arcs," which in this case are the device-to-device communications links over the one or more of the networks (including device-to-server links). "Weight" values may be assigned to each arc based on, among other things, the speed and latency of the corresponding network connection (either actual or approximated). So, for example, a graph arc representing a direct node-to-node communications link employing a high-speed protocol (e.g., IEEE 802.11ac WiFi) may be assigned a lower weight "cost" than an arc representing a direct link between the same nodes employing a slower protocol (e.g., Bluetooth). Weights may be directional, such as if the weight from device 1 to device 2 over the WLAN is different than the weight from device 2 to device 1 over the WLAN (e.g., due to latency difference due to difference is connection quality. Weights may be assigned based on actual measurements of factors such as latency or by approximation.

Based on the weights assigned to the arcs, the graph optimization scheme may determine the actual or approximated least-cost paths through the graph from the start node (e.g., user's device 111) to the other nodes, where the user's device 111 queries devices where the "cost" of reaching that device's node in the graph is lower than other choices. The cost is based on the sum of the "weight" values between nodes. For example, referring to FIG. 1, if the arc representing the PAN link between the device 1 (111) and local device 3 (113) is assigned a same weight value as the arc representing the PAN link between local device 3 (113) and local device 4 (114), then the graph weight for a communications connection between the user device 111 and local device 4 (114) over those arcs via local device 3 (113) will have a "cost" at least twice that of the arc between user device (111) and local device 3 (113).

The weight of traversing a node may be included in the weight of an arc. For example, if using device 3 (113) as a relay node to reach device 4 (114), the latency contributed by tunneling through the node itself (i.e., device 3) may be included in the weight assigned to the arc. Weights assigned for traversing a relaying node may either be included in the arc's weight, or added to the cumulative cost, such as an additional "node" weight to be summed with the arc weights. Likewise, latency contributions of other network relays such as routers (e.g., WLAN routers (e.g., 113) and cellular base stations (e.g., 132)) may be added to the connecting arc, or may be added as a separate "node traversal" tunneling cost. The weight "cost" of traversing a node, like the weights assigned to arcs, may be directional, such that the cost of traversing a node in one direction may be different than the cost of traversing in the other direction. In the case of long-haul networks, a number of routing "hops" may be determined (discussed further below), with a weight assigned to each hop that is added to the sum of weights to traverse the graph between nodes.

Additional constraints may be imposed based on criteria such as a potential financial cost to a user of a device (e.g., peer devices 111-114) based on the network to be used for communication to-or-through the device (e.g., wireless data network access costs for cellular data networks such as telecom cellular network 2 (122) in FIG. 1), and stored device preferences specifying limits on usage of different types of network and cache transactions (e.g., a server-signed shared table comprising preferences specified by the peer devices 111-114). An example of another constraint is limiting how often a user's device is used for shared cache activities, since such activities consume both power and network resources.

Since there may be multiple "direct" communications paths between two devices, multiple arcs may exist between the corresponding nodes in the graph. For example, two devices may be able to establish peer-to-peer connections via Bluetooth and WiFi Direct, as well as via a WLAN router 131. Likewise, based on direct communications and indirect "relayed" communications (e.g., passing through other devices in a mesh network), multiple pathways may exist through the graph between two nodes. Thus, graph optimization schemes are well suited to determine which shared-cache devices should be queried for content, which communications links should be utilized for each query, and whether a request should be sent to the server for content. In some situations, the graph-cost of querying the server may be less than the graph-cost of querying some local devices (e.g., devices that must be reached through several other devices serving as relays in a mesh network).

If the user device 111 attempts to query a device but the query is unsuccessful (e.g., no acknowledgement or reply is received as to whether the content is or is not available), the user device 111 may proceed to the next-least-cost solution as determined from the graph modelling the topology of the system 100. The next-least-cost solution may be to a different destination node/device than the node/device that did not reply, and the search may not return to the device/node that did not reply until a different communications pathway is identified as the next least-cost solution. When a device replies that it does not have the content, nodes in the graph representing that device may remain as relay nodes, but further graph solutions that result in that device as a destination node (i.e., the device to be queried) are not explored and/or ignored.

Constraints-based weighted graph optimization may be also used by the server 110 to determine a least-cost path to a device that is to store content for the shared cache. If the server 110 determines that multiple devices are suitable for storing shared cache content, one or more least-cost solutions may be used to cull the candidate devices down to a target number.

Weighted-graph optimization schemes are known in the art of "combinatorial optimization," which is a discipline within the field commonly referred to as "artificial" or "machine" intelligence. Such algorithms use various heuristics to determine the least-cost solutions, which may make searching the graph for the least-cost solution more efficient than a "brute-force" approach to determining the least-cost. Also, there are heuristic algorithms that find the "absolute" least cost solution (which is the "ideal" least cost), as well as heuristic algorithms that find the "approximate" least cost solution (which may or may not be the actual least cost). For graphs with a small number of nodes (e.g., four or five), the computational burden of the absolute solution versus the approximate solution may be about the same. However, as the number nodes increases, "approximate" least-cost solutions typically offer a reduced computational burden and produce solutions that are suitable for shared-cache queries.

Figure 2:
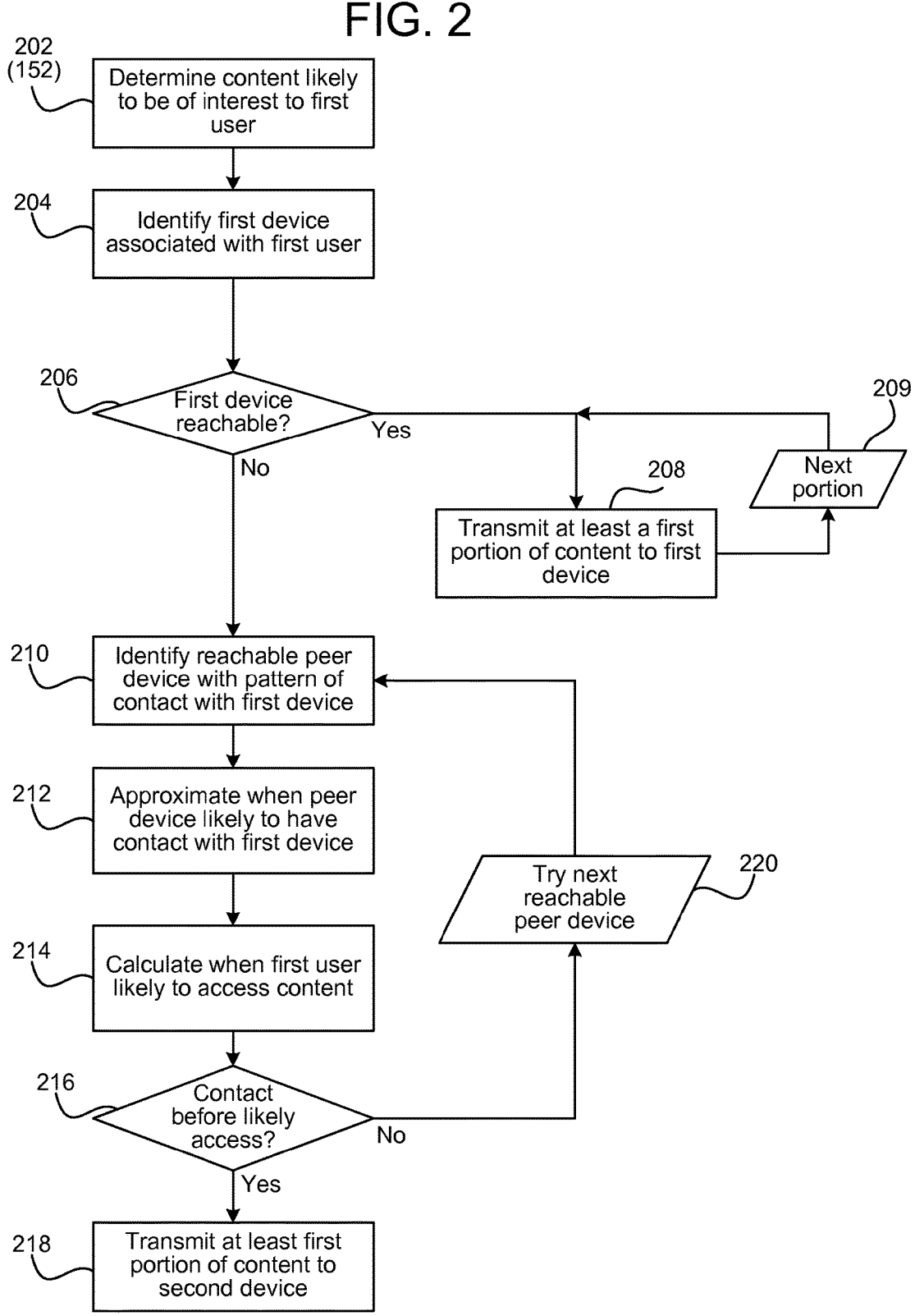
FIG. 2 illustrates an example of a process that distributes content to a target device via a peer device utilizing the shared distributed edge cache.

FIG. 2 illustrates an example of a process that distributes content to a target device 111 via one-or-more peer devices utilizing the shared distributed edge cache 140. The content server 110 determines (202, 152) that there is content that is likely to be of interest to the first user 11. Any of the numerous algorithms that have been developed to predict content that will be of interest to a user may be used, including (among others) those used to target online advertisements, and those used to suggest media for online video/audio streaming based on past media consumption by a user, user profile information, or the like.

The content server 110 identifies (204) a first device 111 associated with the first user 11. The association may be stored in a database, maintained as part of the user's profile, etc. After the first device 111 is identified, the content server 110 may attempt to pre-cache the content on the user's device, attempting to connect to the device 111 via a supporting network such as the Internet 121, a cellular network 122, and/or other data networks that the first device 111 has available for content delivery. Among other things, this may involve use of a "push" technology, where the server 110 transmits content to a subscribed device without requiring the device to request transmission.

If the device 111 is reachable (206 "Yes"), the content server 110 may transmit (208) at least a first portion of the content to the first device 111, to be pre-cached for the user 11. If there is another portion (209), the content server 110 may continue this process of pre-caching content by transmitting to the first device 111. However, if the content server 110 is unable to communicate with the device 111 (206 "No"), the content server 110 proceeds to determine whether another user's device is known to share a cache with the user 11, is subscribed to the service supported by the content server 110, and/or is determined to have a pattern of contact with the first device 111. These "relationships" between devices may be based on information stored in the profiles of the respective users' accounts, based on a commonality of utilizing a same network addresses (e.g., a same Internet Protocol (IP) address), based on uploaded configuration settings from the respective devices, based on a record of past communication contacts between the devices, and/or based on subscriber proximity software included in the subscription application that finds (e.g., periodically) other nearby subscriber devices. Real world examples include a record of the two devices regularly connecting to the Internet from a same wireless WiFi router at overlapping times every morning, and/or the two devices being "paired" for direct device-to-device Bluetooth communications, and/or global positioning system (GPS) mapping software on the devices providing the server 110 with movement and location data indicating that the devices are approaching each other or are already within a direct communication distance of each other.

From among the peer devices determined to have a "relationship" with the user's device, the content server 110 proceeds to identify (210) a network-reachable peer device. A "network reachable" device is a device that the content server 110 determines it can currently communicate with via one or more available networks. Multiple devices may be polled by the content server 110 to determine availability, to determine whether any of the candidate devices can currently detect the first device 111 via a local network, and/or collect additional information such as the last time each network reachable peer device 112/113/114 detected and/or communicated with the target user device 111.

The content server 110 may identify (210) network-reachable peer devices in a number of different ways.

A first example of how the content server may identify network-reachable devices is by having a client device negotiate a local network with peers, and query peers with a server-forward request. This can be permitted by either permission-token signing on the server-disconnected client device to allow the pass-through transaction or by optimistic permissiveness on the part of the fully connected device. That optimistic permissiveness can be backed off for repeat-offense tunnellers, as the server response may be cryptographically signed for the intermediary device while still being cryptographically sealed for the connected device. This may be done for a device based on a challenge-response against a downstream keyer (DSK) signature or based on a time-expiring token (to prevent long-term attack vectors).

A second example of how the content server may identify network-reachable devices is that the server 110 may issue periodic encrypted "phone-home" commands in bulk. These are transmitted from peer-to-peer based on hash presence (e.g., match up a database, track "I-have-seen" status locally, through generation of a Merkle tree, etc.). The encapsulated phone-home commands can be batch keyed or device-specific keyed, allowing for non-spoofable device-request tunnel permission. In particular, this approach may be done with "long-wait" or "have-not-been-seen-in-a-while" devices.

A third example of how the content server may identify network-reachable devices is that the server 110 may issue explicit full-network query commands (sort of like a pulse, ripple, or heartbeat) that may be sent to network-connected devices. The server 110 builds a topological map from the server-side based on direct and tunneled responses. To prevent odd topological echo defects and runaway network conditions, a non-encrypted expirable resource counter may be included in the query-command transmission.

In any case, client/server communication of a local-network-only client is preferably encrypted. Authorization for communication between peer devices may be brokered by verified server signature to prevent abuse.

Current location information may also be collected from the peer device or devices 112/113/114, to be compared to stored information from the target device 111 (e.g., the target device's last known geographic and/or network location). There are two types of locations that matter: one is transient topological (which is useful and easy to ascertain, but ephemeral), and the other is geographic. Geographic situation can be determined by the global positioning system (GPS, included in many devices with cellular radios), coarse cellular radio tower location, WiFi-visibility location, etc. For example, any mechanism that may be used to determine the location of a cellular telephone handset may be used with system 100.

In addition, peer-to-peer local device disposition can allow the system 100 to tie the position of a device that cannot get a GPS fix (or does not have GPS capability) to a reasonable range from a device that can, allowing effective creation of a dynamic position-assistive database. For example, referring to FIG. 1, if device 4 (114) does not have GPS access, but is tied to device 3 (113) by a short-range PAN network 123, and the GPS location of device 3 (113) is determined, then a position of device 4 (114) can be dynamically approximated.

Among other reasons to check the peer device's (e.g., 112-114) current geographic location and/or current network access point (i.e., network location, such as an identity of a WLAN access-point router being used by the respective peer device to access the Internet) is to avoid attempting to pre-cache content on the peer device when the peer device is less likely to be proximate to the user device 111 any time soon, based on the user device's (111) last stored location or anticipated future location (e.g., based on probabilistic factors such as a pattern of connecting to one or more networks at a particular location at a particular time, as discussed further below). Pre-caching content on a peer device (e.g., 112-114) that is unlikely to be proximate to the user device 111 any time soon is an inefficient utilization of the storage capacity of the peer device 112-114, and may needlessly consume device power (e.g., drain its battery) and waste network capacity without benefit.

To clarify, the devices 111, 112, 113, and 114 are all "peer devices." In the illustrated hypotheticals, user device 111 is the peer device associated with the first user 11 for which the content server 110 is attempting to pre-cache content. All four peer devices 111-114 share distributed cache 140, such that the distinction between the peer devices is one of circumstance and user association, rather than a meaningful functional difference between peer devices. The peer devices 111-114 need not be identical, but each offers its respective user 11-14 some means for consuming content received from the content server 110 (although peer devices 112-114 are not necessarily able to output/play the particular content that is being pre-cached for the peer "user" device 111 associated with the first user 11).

Probabilistic factors may also be considered, such as a direction of travel of a peer device 112-114 being toward the first user's last known location or expected future location based on past patterns. For example, every weekday the second user 12 may ride the train to work, with the first user 11 boarding the same train at a different location. Based on navigation data (e.g., global positioning system (GPS)) and peer-connectivity topological awareness information provided to the server 110 by the peer devices in the past (stored by the server 110), the server 110 may determine that there is a probability that the first device 111 and second device 112 will share connectivity between "Location A" (e.g., where user 11 boards the train) and "Location B" (e.g., where the first and/or second users get off the train). By determining that it is a weekday and that the second device 112 is travelling toward the Location A (e.g., using current "live" GPS data from the device 112), a probability may be calculated that the first user's device will have contact with the second user's device at Location A. An expected time that contact is likely to occur may also be calculated based on past data and an estimated time that the second device 112 will arrive at Location A.

The server 110 may also use topological awareness information to determine which peer devices 112-114 are currently best-suited for pre-caching based on the connectivity of each device. For example, if the second and third peer devices 112 and 113 are currently connected to the user device 111, or have similar probabilities of future contact with the user device 111, but the second peer device 112 is currently reachable via a high-speed long-haul connection while the third peer device 113 is not, the server 110 may preferentially pre-cache on the device 112 reachable via the high-speed connection instead of the other device in accordance with one or more rules.

Likewise, rules may specify not to select (or negatively bias the probability of selecting) a peer device 112-114 that is not directly reachable via a long-haul network, such as a device at the edge of the local network (e.g., the fourth user's device 114). Even so, if the edge device is indirectly reachable (e.g., via the PAN connection to peer device 113) and has a high probability of contact with the user device 111, the edge device 114 may nonetheless be selected for pre-caching. The content server 110 may select (or positively bias the probability of selecting) a peer device 112-114 for pre-caching based on the free space available in the device's shared cache segment (e.g., if the third user's device 113 shared cache segment is full, the server 110 may leverage that device's PAN connection to the fourth user's device 114, if the fourth user's device 114 has excess shared cache storage capacity).

An advantage of pre-caching on a peer device 112-114 with local network connectivity to the user device 111 (or that is expected to soon have local network connectivity to the target device) is that such pre-caching avoids the communication bottlenecks of the long-haul networks (e.g., the Internet, the telecommunications network) by leveraging the local connection between the peer device and the user device. This advantage of pre-caching to avoid long-haul network bottlenecks may be undermined if the devices 111-114 must share cached content with each other over those same long-haul networks.

From database information about the user device 111 and the peer devices (e.g., 112, 113, 114), and/or current data provided by the peer devices 112-114, the content server 110 determines (212) an approximation of when each peer device 112-114 is likely to have its next contact with the user device 111. For example, the server 110 may make a historical statistical inference by a "coarse" technique such as cluster-weight annealing. As a more tailored example, the server 110 may determine a solution to when each peer device is likely to have its next contact with the user device 111 using a sparse-graph problem model, using Probabilistic Graphical Modeling with marginally constrained machine learning (i.e. using a computationally intensive approach to "fit" an unknown curve). As another example, the server 110 may use calendar-and-weekday-correlated most-recently used (MRU) data to determine when each peer device is likely to have its next contact with the user device 111.

The content server 110 may prioritize/order candidate devices based in part upon this approximation, and other factors, such as the speed of the network connection(s) available between the server 110 and the peer device 112/113/114, and the amount of free space available in the shared-cache segment on a peer device 112/113/114. The content server 110 also calculates (214) when the first user 11 is likely to access the content, for example based at least in part on a past pattern of content consumption by the user. This calculation may be an approximate time or a set of probabilities over a range of time.

For example, if server 110 performs a calendar-correlated MRU weighting, a near-term match can be checked against time-windowed distributions at any granularity. For instance, the server 110 may track the likelihood that two devices will be proximal given the hour of the day, as a restricted subset of the total set of devices based purely on MRU data. Using this hourly probability and user consumption habits, a probability can be determined that content will be available for a particular user from an associated device, so that the server can seed content to devices most likely to interact with the devices of users most likely to consume content. The injection of some noise into the probabilistic results may be used to keep from over-biasing towards delivery of content to only historical users. In essence, this noise is statistical "slop" that may be added to account for behaviors that are not historically reflected.

The content server 110 may determine whether or not to transmit content to a candidate peer device based on whether (216 "Yes") or not (216 "No") the peer device 112-114 is expected to have local "timely" contact with the user device 111 prior to when the first user 111 is expected to consume the content by comparing the approximation of when the peer device 112-114 is likely to have contact with the user device 111 (from 212) with the calculation of when the first user 11 is likely to access the content (from 214). This comparison may factor also in the data rate of the network connection between the server 110 to the peer device 112-114, the size (e.g., size in megabytes, gigabytes, etc.) of the portion of the content to be pre-cached (e.g., a large portion over a fast connection may be timely, whereas the same large portion over a slow connection may not be), and the data rate of the local network that it is anticipated that peer device 112-114 will use to share the portion of pre-cached content with the user device 111 (e.g., if the devices are anticipated to be in proximity for less time than it is anticipated that it will be required for transfer of the pre-cached data over the local network between devices, then while there may be contact, data delivery may not be timely). The expected contact (212) of the peer device 112-114 with the user device 111 may be an approximated time or a set of probabilities over a range of time. If the peer device is not expected to have timely contact with the user device 111, the content server 110 may consider the same factors for another peer device (220). Whether contact is "timely" may be determined by rule, determining whether the approximated expected contact (212) exceeds the time the first user 11 is likely to access the content (214) exceeds a threshold amount of time. Whether contact will be timely may be further based, at least in part, on the amount of time the devices are expected to be in communication contact, requiring the anticipated duration of contact to exceed that ordinarily necessary to transfer the pre-cached data between devices. Otherwise, after the determination (216 "Yes"), at least the first portion may be transmitted (218) to the peer device 112-114 for pre-caching, to be shared with the user device 111 over a local network.

Illustrated process steps in FIG. 2 may be performed in a different order or in parallel, such as determining when the first user is likely to consume the content (214) prior to determining whether to pre-cache (e.g., before step 204), and approximating when a peer device 112-114 is likely to have contact with the user device (212) prior to determining whether that candidate device is reachable.

Figure 3:
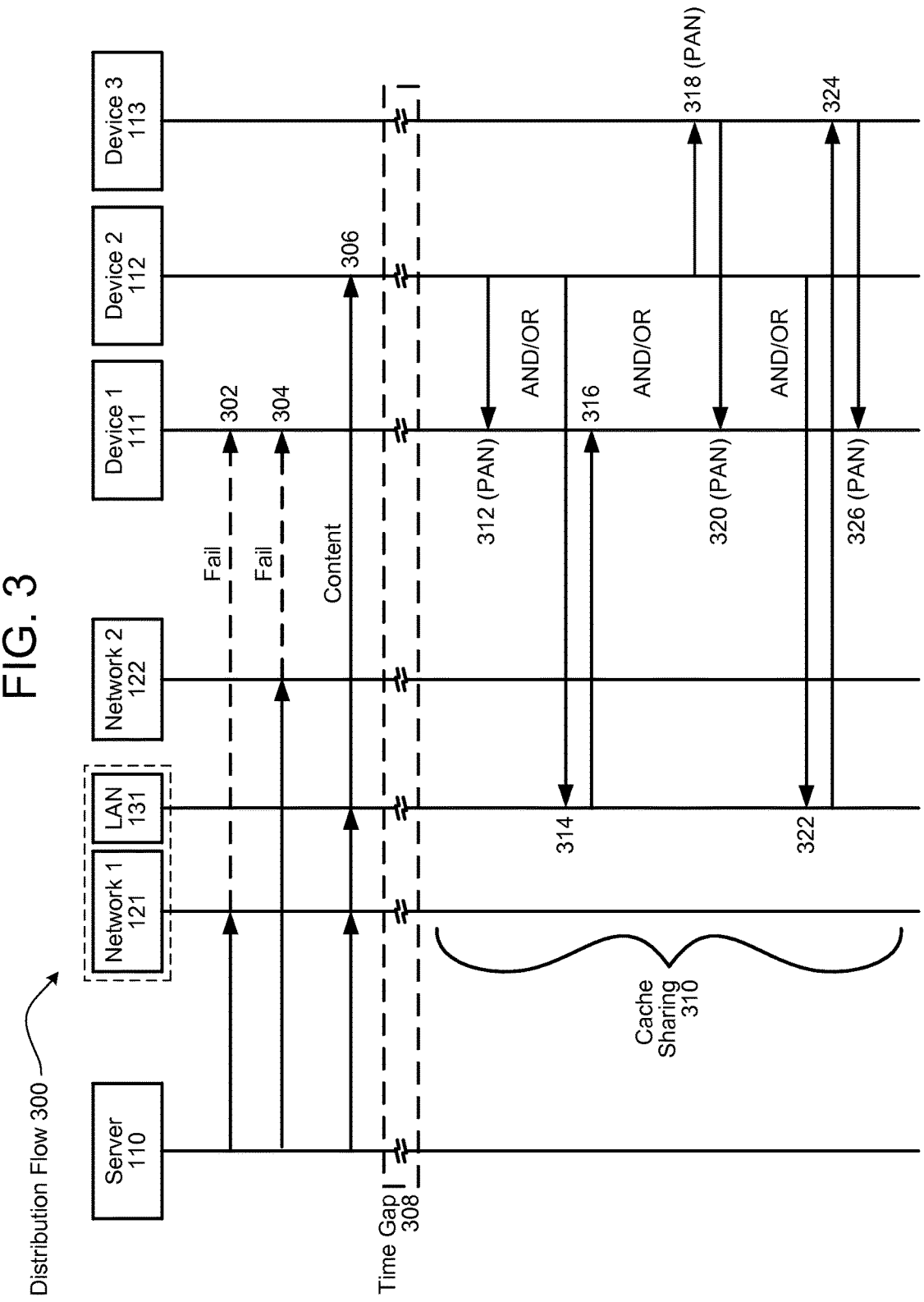
FIG. 3 illustrates a communication flow diagram as an example of the process in FIG. 2.

FIG. 3 illustrates an example of a content distribution flow 300 based on the method in FIG. 2. The content server 110 attempts to connect to the user device 111 via a first network 121 (attempt 302) and a second network 122 (attempt 304), but both attempts fail. The content server 110 then determines that a second device 112 of a second user 12 is a suitable candidate device for pre-caching, as described in connection with FIG. 2. The content server 110 then transmits (306) at least a first portion of the content to the second device 112 via the first network 121 for pre-caching.

After a gap 308 of time, the cached portion is locally shared 310 between the first and second devices. Cache sharing distribution may occur if the devices detect each other within a certain proximity and the second device indicates that there is new cache content, and/or may occur when the first user 11 attempts to access the content and queries devices sharing the shared cache 140 to determine whether any of the content is locally stored, etc. The content server 110 may also send a notification that a portion of the content was pre-cached on the candidate device.

A variety of local distributions paths may be possible, and the distribution may use more than one. For example, the second device may transmit the portion to the first device over a PAN connection (312), such as Bluetooth, or via a local wireless LAN 131 connection (314, 316), such as WiFi.

The peer devices (111, 112, 113, 114) sharing the cache 140 may also form a mesh network, where each peer device is available to relay data to another, cooperating on routing and distribution. For example, the second device 112 may be too far away from the first device 111 to establish a PAN connection, but may be close enough to a third device 113, which can reach the first device 111 via a PAN connection, such that the second device 112 relays (318) the content via PAN to the third device 113, which then forwards (320) the content to the first device. A mesh network may be similarly include WLAN connections, such as by using multi-band WiFi to support multiple simultaneous connections. A device on the mesh may utilize communication pathways across multiple networks, such that a single mesh network may comprise networks multiple different networks.

As another example of a mesh arrangement of sharing cached content, the second device 112 and the third device 113 may be able to communicate via a local wireless LAN router 131, but the first device 111 may not be connected to the wireless LAN. However, the third device 113 may be able to establish a communications connection to the first device 111 via a PAN connection. So to share content, the second device 112 may relay the content (322, 324) to the third device via the local wireless LAN router 131, with the third device 113 relaying (326) the content to the first device 111.

The cache sharing 310 examples in FIG. 3 are examples, and other arrangements are possible. However, these examples demonstrate that the peer devices (111, 112, 113, 114) may cooperate across multiple local networks to distribute shared cache 140 content amongst themselves. Also, when a device relays content from the shared cache 140 to another device, it may keep a copy of the content for itself.

As noted above, the order in which shared cache devices are queried for content and the particular network connections used, may be determined (among other ways) using a constraints-based weighted graph optimization. For example, whether device 1 (111) first queries device 2 (112) or queries device 3 (113) for cache data may be based on a least-cost solution (either absolute or approximated), with the graph arcs comprising connections 312 to 326. WLAN router 131 may be modeled as a node on the graph, in which case connections 314, 316, 322, and 324 are each an arc on the graph. In the alternative, connections 314 and 316 may be combined as a single arc, and connections 322 and 324 may be combined as a single arc.

Figure 4:
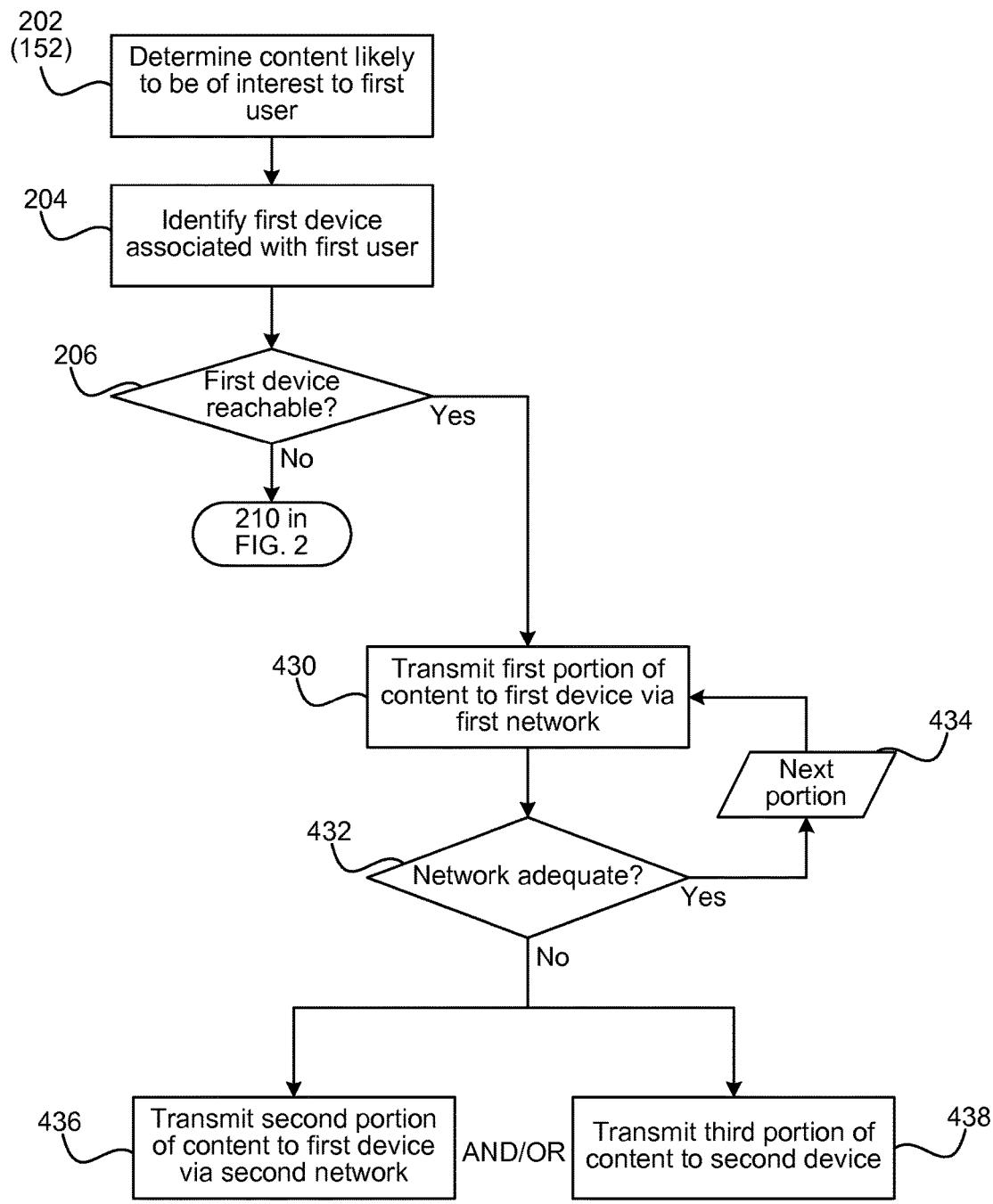
FIG. 4 illustrates an example of a process that distributes content to a target device via multiple distribution paths, leveraging both direct communications and the shared distributed edge cache.

FIG. 4 illustrates a refinement of the process in FIG. 2, demonstrating how multiple networks may be leveraged to locally pre-cache the content. If the first device is reachable (206 "Yes"), the content server 110 transmits (430) a first portion of the content to the first device 111 via the first network 121. Which network the content server 110 chooses to initially send the content by may be in accordance with one or more rules based upon user preferences, network speed, potential financial cost to the user (e.g., extra data costs to the user if the cellular telephone network is used), etc. If the current time plus a calculated transmission duration (e.g., the size of the portion divided by a measured data rate of the network) is less than the time at which the first user is anticipated to access the content (214 in FIG. 2) minus a threshold "margin" time value (432 "Yes"), then, the content server 110 sends the next portion (434) to the first device 111 for pre-caching in the same manner.

For example, say the size of the portion may be fifty megabytes (50 MB) and the data rate is two megabits per second (2 Mbps). Data and data file sizes and network usage are usually measured in bytes (abbreviated with a capital "B"), whereas data rates are usually measured in bits (abbreviated with a lowercase "b"). There are eight bits in one byte, so 50 MB equals 400 Mb. Since the time for transmitting the portion is equal to its size divided by the data rate, the transmission time is equal to 200 seconds (400 Mb divided by 2 Mbps). With 60 seconds in a minute, that comes to approximately 3.34 minutes.

If the server 110 determines that the first user is expected to access the data at time "T," it is preferable to include a margin of error so that the content reaches the first user's device (111) prior to time "T." This margin of error is quantified as a threshold "margin" time value. This threshold margin time value may be a time value expressed in units of time (e.g., two minutes) or as a percentage of T (e.g., 20% of T). If it is anticipated that the first user 11 will access the content in ten minutes, and the threshold margin time value is 2 minutes or 20%, then 3.34 minutes is less than 8 minutes, so there still is still time to pre-cache content directly to the user's device. The threshold margin time value may be adjusted during the process based on rules-based criteria, such as reducing the threshold margin time value as the percentage of the total content that server 110 has locally pre-cached increases.

Data rates may be measured by the server 110 and/or peer devices 111-114 using periodic bulk (but still small) transfers over detected available routes to a plurality of known devices and/or servers. Additionally, other characteristics such as latency can be determined (as is commonly done with online game servers) by releasing time-stamped flooding packets and determining the reception slew. A performance graph of each route can be aggregated with common matching graphs to determine known route rates (that can account for saturation and time variation). In addition to being used by the server 110 (e.g., step 432), this data rate and latency data may be used to compute the arc weights and node latencies used by the individual devices when determining a least-cost solution for querying other devices for cache content. This data rate and latency data may be periodically shared amongst the peer devices and the server as cache tables.

Otherwise (432 "No"), the content server 110 may continue pre-caching content on the first device via the first network, but may also transmit (436) portions to the first device via a second network, and/or transmit (438) portions to a candidate peer device (e.g., 112, 113, and/or 114 via 113) for pre-caching via one of the networks. By dynamically leveraging multiple paths to the shared cache 140, the content server 110 better assures timely delivery of the content, even if the first device's primary network connection is slow or otherwise inadequate to transfer content.

Figure 5:
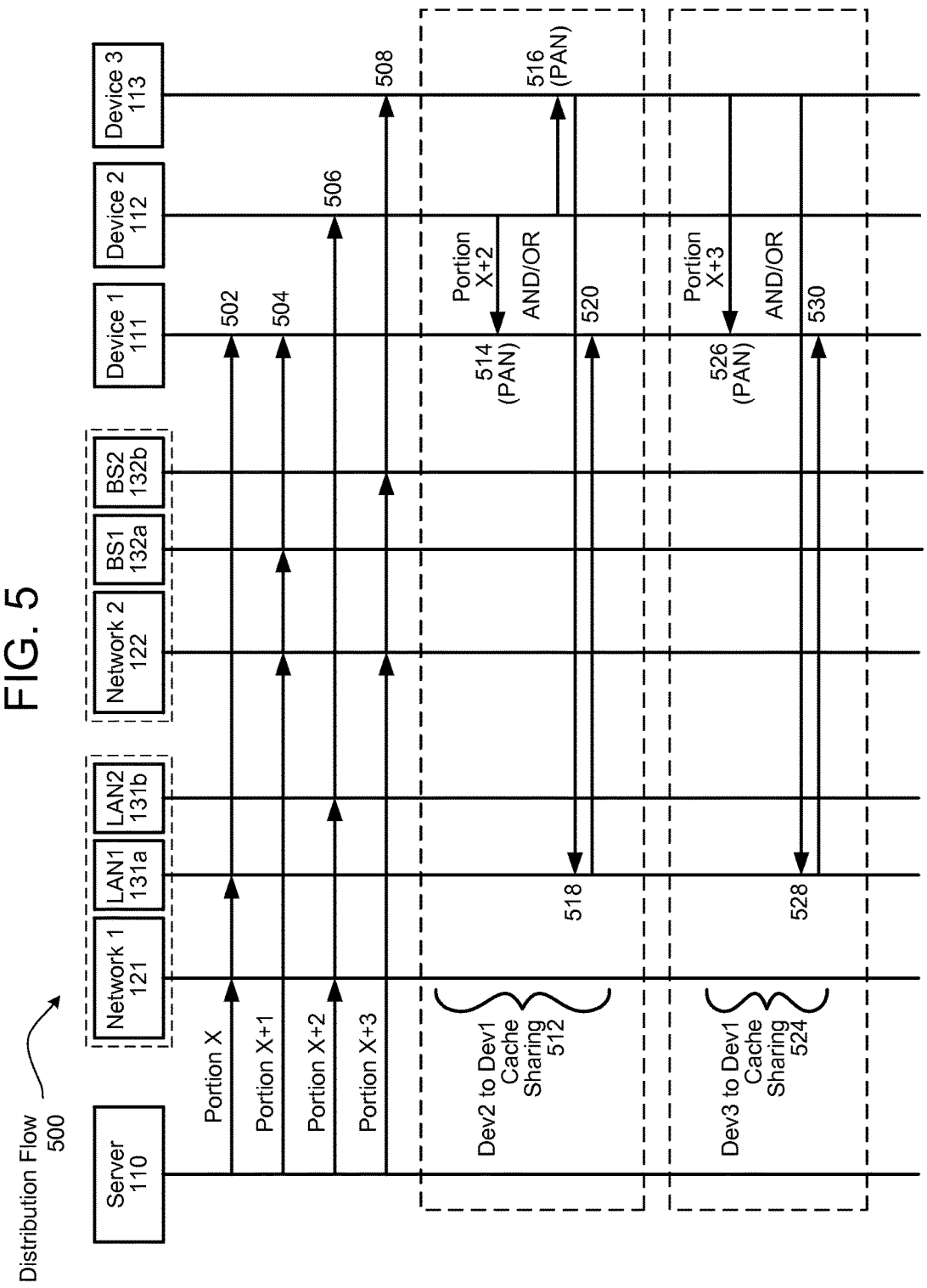
FIG. 5 illustrates a flow diagram as an example of the process in FIG. 4.

FIG. 5 illustrates an example of a content distribution flow 500 based on the combined processes in FIGS. 2 and 4. The content server 110 transmits (502) a first portion of the content (Portion X) to the first device 111 via the first network 121. However, the content server 110 determines that the connection via the first network 121 is too slow to assure timely delivery. This determination may be done by taking the historical network behavior for a particular associated node and a probabilistic "field of consumption" probability. These combinations can then be stacked to prioritize content delivery to the caching network where insufficiency of situational bandwidth is more probable.

If a device has historically had excellent network connectivity, there may be a reduced likelihood that the server would waste aggregate bandwidth by seeding that device or its graph-proximal nodes. Instead, the probabilities may result in the system 100 using that device for network reinforcement for transiently connected low-availability associations.

Absent modification, this historical network behavior model can break down if there is no history, so to avoid breakdown, probability data may be blended between a null behavior (balanced, even-weighted cache eviction and distribution) and a derived behavior, never exceeding constraints (e.g., null is always between 100-30% blend).

Based on this determination, the content server 110 transmits (504) a second portion (Portion X+1) to the first device 111 via a second network 122, a third portion (Portion X+2) to the second device 112 via the first network (506), and a fourth portion (Portion X+3) to the third device 113 via the second network (508). The connections to the first device 111 via the first network (502) and the second network (504) may overlap in time, such that the first device 111 may be receiving both the first portion and the second portion at a same time via different communications channels.

When determining whether to pre-cache on a peer device 112-114, the content server 110 may determine whether the network address (e.g., IP address) of the peer device 112-114 is the same as the first device 111. If it is, and the connection speed to the user device 111 is inadequate (432 "No"), a rule may specify not to select that network path to the peer device 112-114, since the bottleneck to the user device 111 is likely to be made worse by attempting to send more data via the same path. As illustrated, the user device 111 connects to the first network 121 using a different access point (wireless LAN 131a) than is used by the second device 112 (which uses wireless LAN 131b). FIG. 5 also illustrates that the first device 111 may be connected to the second network 122 via a different access point (base station 132a) than is used by the third device 113 (connected via base station 132b).

For the purpose of cache sharing in the examples in FIG. 5, the first device 111 and the third device 113 share a same wireless LAN (131a), but the second device 112 is connected to a different wireless LAN (131b). All three peer devices (111, 112, 113) may or may not be in sufficiently close proximity to each other to utilize peer-to-peer PAN connections, depending upon the sharing scenario.

As illustrated, the second device 112 may share its portion of the cached content (512) with the first device 111 via a peer-to-peer PAN connection (514), but may or may not be able to establish a wireless LAN link without accessing the first network 121, since the two devices are connected to different wireless LANs (131a, 132b). If unable to establish a direct wireless LAN link, the second device 112 may utilize the mesh, transmitting (516) its portion of the content to the third device 113, which then relays (518, 520) that content to the first device 111 via the shared wireless LAN connection 131a.

The third device 113 may share (524) its portion of the cached content with the first device 111 via a PAN connection (526) and/or via the shared wireless LAN connection (528, 530).

As noted above, the communications pathways and order in which shared cache nodes may be queried for content by the user's device 111 maybe in accordance with a constraints-based weighted graph optimization scheme. In addition to modelling the peer devices and server as graph nodes, each of the may WLAN routers 131a, 131b and cellular base stations 132a, 132b may be modelled as nodes, or the connections tunneling through each router and base station may be modelled as a single arc.

Figure 6:
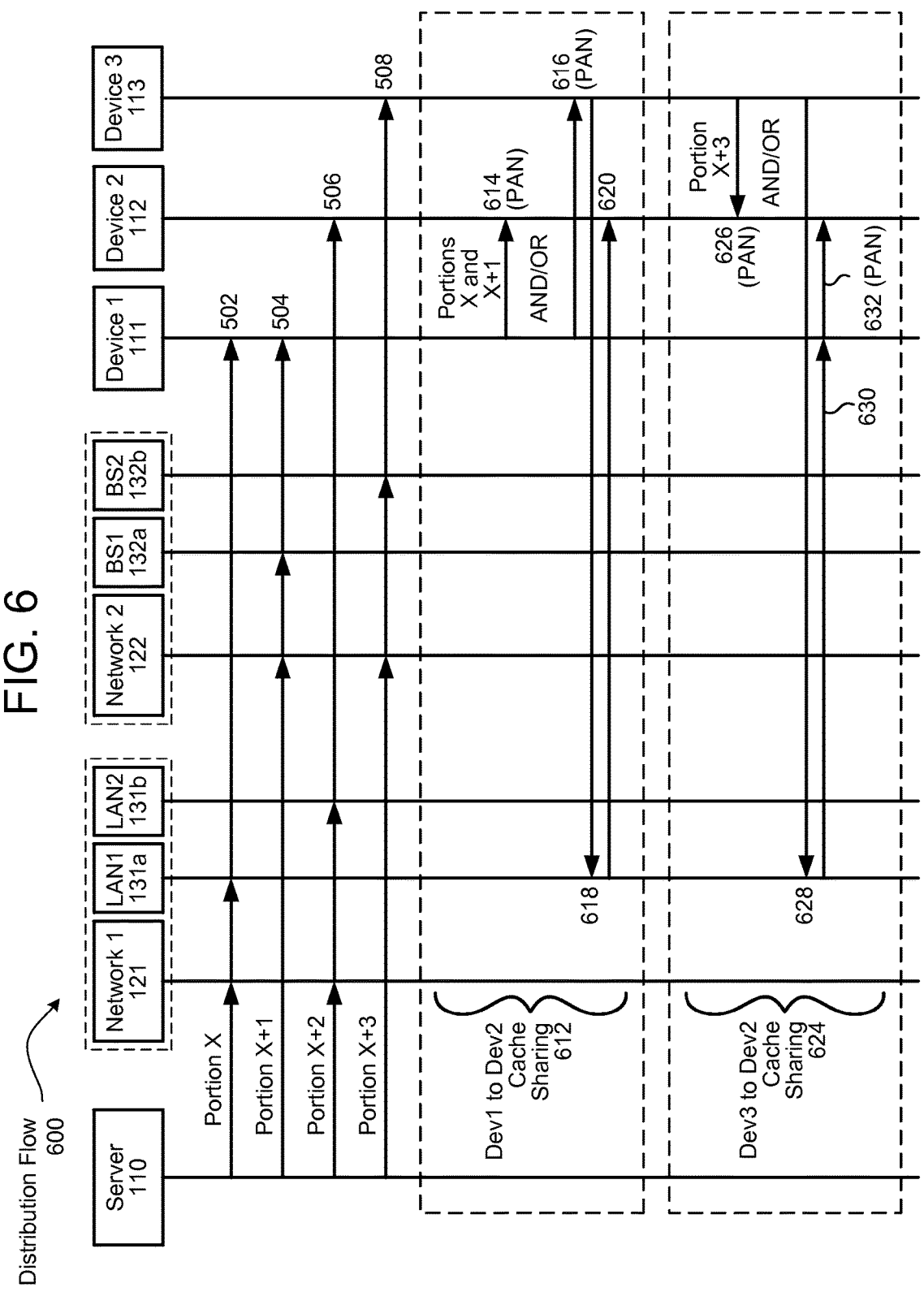
FIG. 6 illustrates a peer device, other than the target device, utilizing content from the distributed cache.

FIG. 6 is an example distribution flow 600 that adds the scenario that a user 12 of the second device 112 accesses the content that was cached in FIG. 5. The second user 12 accessing the cached content may have been unanticipated by the content server 110, or may have been anticipated and have been part of the reason why the second device 112 was selected to receive a portion of the cached content. As noted above, a device that receives or relays data from the shared cache 140 to another device may store a copy in its own portion of the shared-cache.

For the purpose of this example, the second user 12 has consumption rights to the cached content in terms of digital rights management (DRM). However, it is possible that the shared cache 140 may contain content for a target user/device that the other peer devices may not have DRM privileges to access, so although a user's device may store the a portion of the content, that user may or may not be able to play the content.

As illustrated, the first device 111 shares (612) its portion of the cached content with the second device with the second device via a peer-to-peer PAN connection (614) and/or by relaying (616) its content by PAN to the third device 113, which then forwards the content via the shared LAN 131a (618, 620). The third device 113 shares (624) its portion of the cached content with the second device via a peer-to-peer PAN connection (626) and/or by relaying (628, 630) its content via the shared LAN 131a to the first device 111, which then forwards the content to the second device 112 via a peer-to-peer PAN connection (632).

In FIGS. 5 and 6, cache sharing (512, 524, 612, 624) may occur between devices at any time. For example, devices may share cache content after some time has transpired (as discussed with FIG. 3), or a receiving device may relay content to the target device as the content is received. If data is contemporaneously shared, the mesh may provide multiple simultaneous connections between the content server 110 and the target device via an array of network connections available to other devices on the mesh.

The system 100 may be scaled up to manage collective device clustering, allowing the content server 110 to balance a distributed content load on peer devices that the can be expected to have contact with each other, by trajectory tracking and/or historical alignment (e.g., 212 in FIG. 2). For example, if the content server 110 determines that one hundred peer devices configured to share cached content congregate every weekday morning (e.g., on the train to work), the content server 110 may pre-cache portions of the content (or an entirety of the content) onto a certain number of them (for example, ten) overnight. Thus, so long as one of those ten peer devices is pre-cached with the entirety of the content and is present for the morning commute, that peer device may be used to distribute the content to the other ninety peer devices.

Distribution is effectively a non-interfering best-effort optimization that may be based on a few factors (e.g. is there a surplus of battery energy or a constant external source, is there available bandwidth without introducing a usability or latency hit on the communications channel, etc.) to gate distribution, mixed with a prioritization of distribution that is a global optimization (or a regionalized local pseudo-optimization to a degree achievable with available computational resources) of the overall content delivery priority. A constraints-based solver (like package routing and delivery) may be used to inject additional priorities and constraints without resorting to manual modification. This may be a heuristic mechanism, rather than a full algorithmic optimization.

Figure 7:
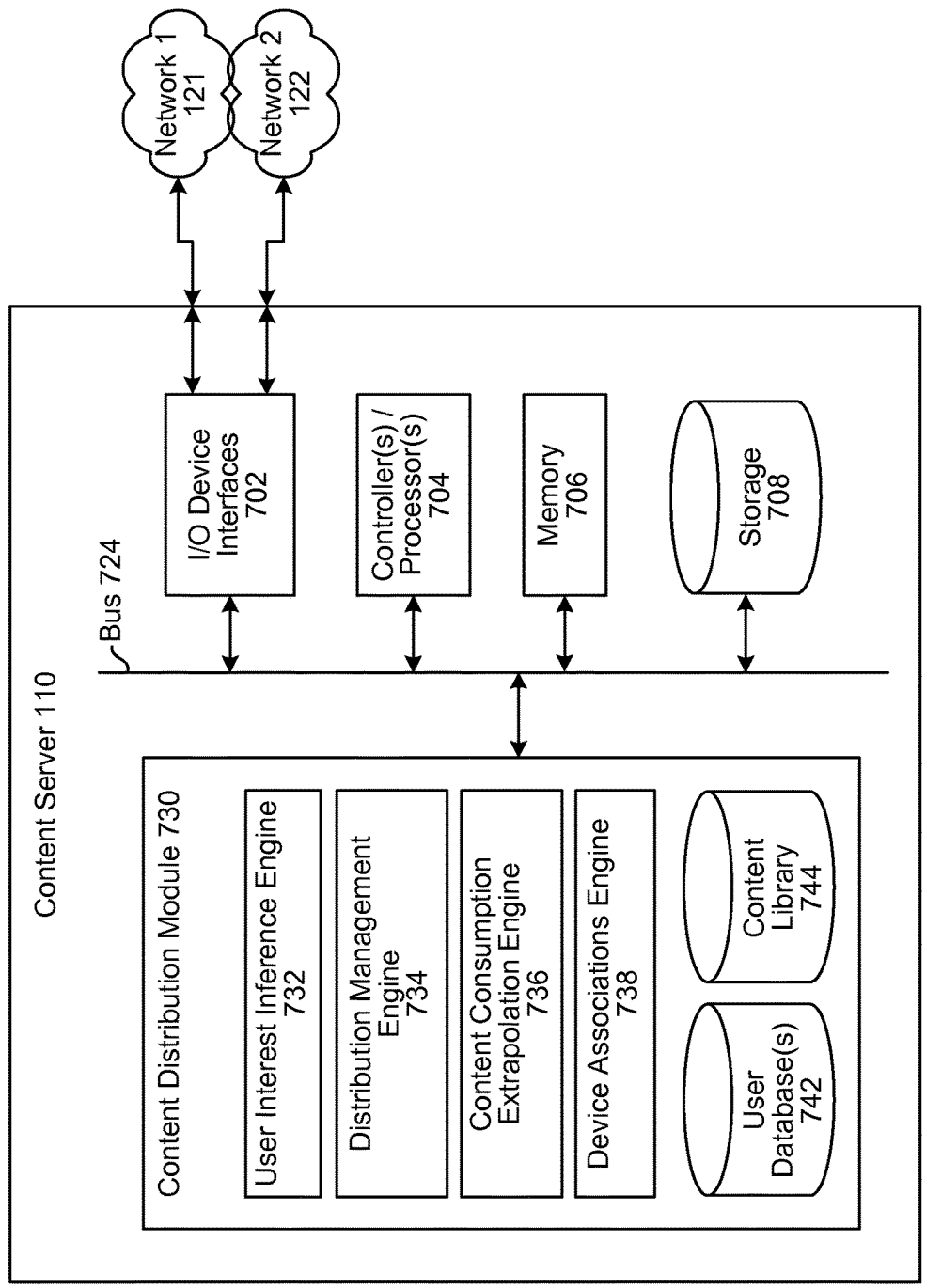
FIG. 7 is a block diagram conceptually illustrating example components of a content server of the system.

FIG. 7 is a block diagram conceptually illustrating example components of the content server 110. In operation, the content server 110 may include computer-readable and computer-executable instructions, as will be discussed further below.

As illustrated in FIGS. 1 and 7, the content server 110 may be multiple networks (network 121, network 122). The networks are illustrated as overlapping because a portion of the network may share infrastructure, such as a cellular telephone network using the Internet for a segment of its communication pathway (or vice-versa).

The content server may include an address/data bus 724 for conveying data among components of the content server 110. Each component within the content server may also be directly connected to other components in addition to (or instead of) being connected to other components across the bus 724.

The content server 110 may include one or more controllers/processors 704, that may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The content server 110 may also include a data storage component 708, for storing data and controller/processor-executable instructions (e.g., instructions to perform the processes illustrated in FIGS. 2 and 4). The data storage component 708 may include one or more non-volatile storage types such as magnetic storage, optical storage, solid-state storage, etc. The content server 110 may also be connected to removable or external non-volatile memory and/or storage (such as a removable memory card, memory key drive, networked storage, etc.) through the input/output device interfaces 702.

Computer instructions for operating the content server 110 and its various components may be executed by the controller(s)/processor(s) 704, using the memory 706 as temporary "working" storage at runtime. The computer instructions may be stored in a non-transitory manner in non-volatile memory 706, storage 708, or an external device. Alternatively, some or all of the executable instructions may be embedded in hardware or firmware in addition to or instead of software.

The content server 110 includes input/output device interfaces 702. The input/output device interfaces 702 may include interfaces for peripheral device connections such as universal serial bus (USB), Thunderbolt or other connection protocol. The input/output device interfaces 702 also include connections to one or more networks (121, 122) via an Ethernet port, a wireless local area network (WLAN) (such as WiFi) radio, and/or wireless network radio, such as a radio capable of communication with a wireless communication network such as a Long Term Evolution (LTE) network, WiMAX network, 3G network, etc. Components of the content server 110 may also be distributed across one or more of the networks.

The content server 110 further includes a content distribution module 730 that performs the processes discussed in connection with FIGS. 2 and 4. A user interest inference engine determines whether content is likely to be of interest to a user (152, 202), utilizing information stored in one or more user databases 742 and metadata associated with the content stored in the content library 744. Although illustrated as being integral in the content server 110, the user database(s) 742 and content library 744 may include remote storage systems, connected by one or more of the networks.

A distribution management engine 734 manages distribution of the content for pre-caching. Among other things, the distribution management engine 734 determines how to pre-cache content, selecting communications pathways over the various networks (e.g., using a constraints-based weighted graph optimization), selecting candidate peer devices for pre-caching, and determining whether transmission speed is adequate for pre-caching. A content consumption extrapolation engine 736 applies one or more statistical analysis algorithms to a user's past content consumption and device usage, utilizing data from the user database(s) 742, to calculate when the user is likely to access the content. As noted above, this calculation may produce a set of probabilities indicating a likelihood of consumption over time.

As an example of a statistical analysis algorithm, a period-modulo historic likelihood index may be used with some introduced intentional error. Boltzmann machines, case based reasoning, decision trees, and other machine-learning approaches may be used as inputs into this predictor. Constraints-based compatible approaches (e.g. automata) may be the settling point. Other, more open-ended machine learning approaches may also be used, but that may result in higher storage costs with only nominal improvement in performance.

A device associations engine 738, utilizing data stored in the user database(s) 742 and acquired by querying candidate peer devices, determines associations between peer devices (the aforementioned device "relationships") based on information stored in the profiles of the respective users' accounts, based on a commonality of utilizing a same network addresses (e.g., a same IP address), similar network addresses (e.g., http://176.32.98.166/ and http://176.32.98.168/, where only the least significant portion of the address is different), based on uploaded configuration settings from the respective devices, based on a record of past communication contacts between the devices, and/or based on subscriber proximity software included in the subscription application that finds (e.g., periodically) other nearby subscriber devices. Use of similar network address is a form of "routing location" (similar to geolocation), with the similar network addressed used in combination with other information such as route tracing to extrapolate associations between peer device. The device associations engine 738 may also determine connection speed and latencies, by active measurement and/or based on speed/latency tables received from the peer devices, assembling the topological awareness data used by the distribution management engine 734.

Multiple content servers 110 may be employed in a single system 100. In such a multi-server system, each of the content servers 110 may include different components for performing different aspects of the processes discussed in conjunction with FIGS. 2 and 4. The multiple devices may include overlapping components. The components of content server 110 as illustrated in FIG. 7 is exemplary, and may be a stand-alone device or may be included, in whole or in part, as a component of a larger device or system.

Figure 8:
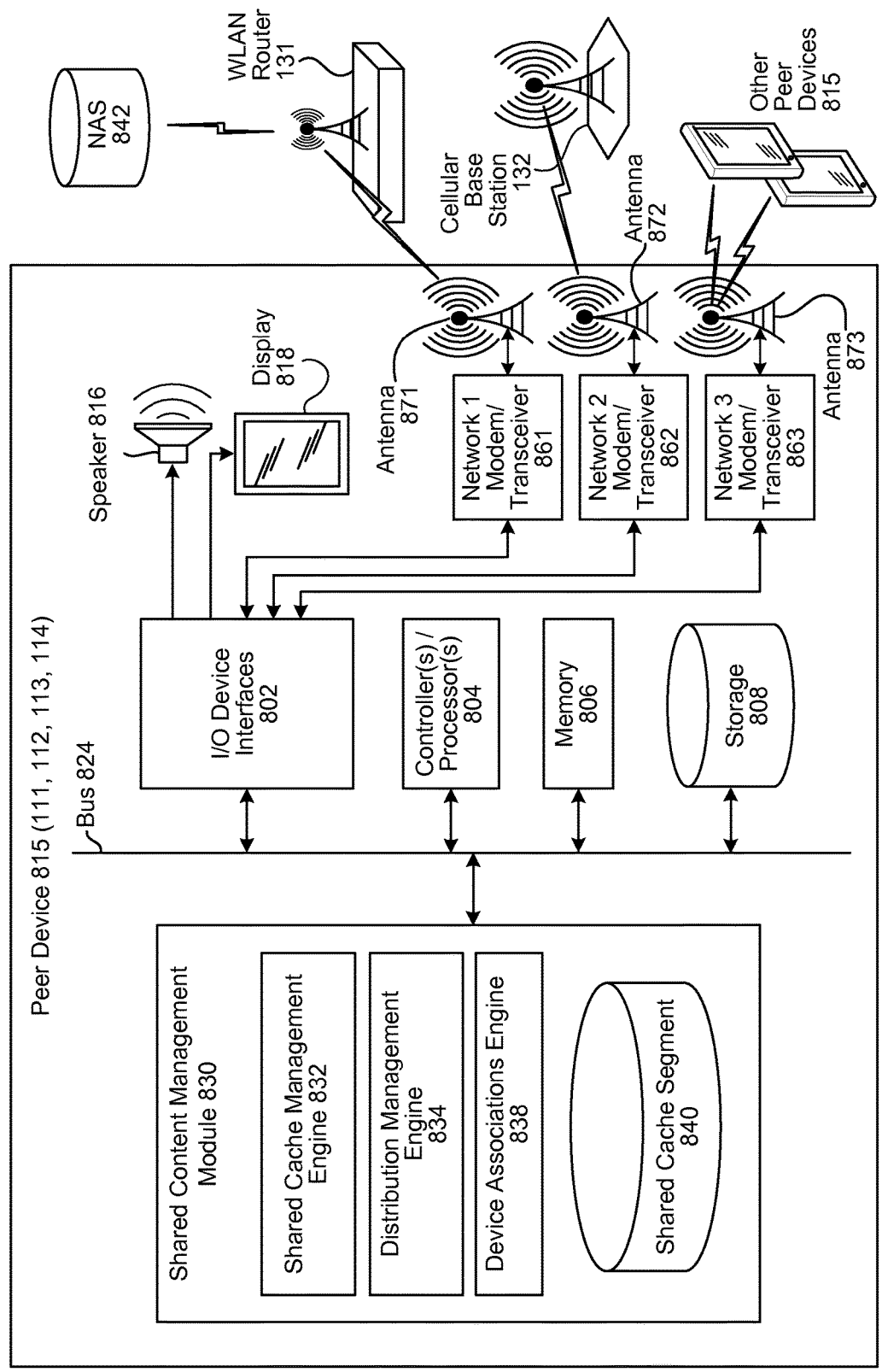
FIG. 8 is a block diagram conceptually illustrating example components of a peer device of the system.

FIG. 8 is a block diagram conceptually illustrating example components of the peer devices 815 (e.g., 111, 112, 113, 114). In operation, each peer device 815 may include computer-readable and computer-executable instructions that reside on the peer device 815, as will be discussed further below.

As illustrated in FIG. 8, the peer device 815 may be connected to one or more network access points (e.g., WLAN router 131, cellular base station 132) and other peer device via a peer-to-peer and/or mesh network 123 (e.g., a PAN network). The peer device 815 may also connect to shared local storage (e.g., network-attached storage, accessible via the WLAN router 131).

The device 815 may include, among other things, an audio output device for producing sound, such as speaker 816, and a video output device for displaying images, such as display 818. The content may be output to a user via the speaker 816 and/or the display 818. Display 818 may be a display of any suitable technology, such as a liquid crystal display, an organic light emitting diode display, electronic paper, an electrowetting display, a cathode ray tube display, a pico projector or other suitable component(s). The audio output device and/or video output device may be integrated into the peer device 815 or may be separate.

The peer device 815 may include an address/data bus 824 for conveying data among components of the peer device 815. Each component within the peer device 815 may also be directly connected to other components in addition to (or instead of) being connected to other components across the bus 824.

The peer device 815 may include one or more controllers/processors 804, that may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 815 may also include a data storage component 808, for storing data and controller/processor-executable instructions (e.g., instructions to perform cache sharing 310, 512, 524, 612, 624). The data storage component 808 may include one or more non-volatile storage types such as magnetic storage, optical storage, solid-state storage, etc. The peer device 815 may also be connected to removable or external non-volatile memory and/or storage (such as a removable memory card, memory key drive, networked storage, etc.) through the input/output device interfaces 802.

Computer instructions for operating the peer device 815 and its various components may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The peer device 815 includes input/output device interfaces 802. A variety of components may be connected through the input/output device interfaces 802, such as the display 818, the speaker(s) 816, and the modem/transceivers (861, 862, 863) to connect to the networks. The input/output device interfaces 802 may also include an interface for an external peripheral device connection such as universal serial bus (USB), Thunderbolt or other connection protocol. The input/output device interfaces 802 may also include an Ethernet port, a connection to a wired or wireless headset, etc.

Antenna 871, 872, 873 are connected to the network modem transceivers 861, 862, 863. However, transceivers operating in a same frequency band on different networks may share a same antenna, and multiple antennae may be combined in a multi-band antenna.

As illustrated, the first network is a wireless local area network (WLAN) utilizing an access point (router 131), such as a WLAN access point supporting IEEE 802.11 WiFi protocols. The second network is a cellular network, such as a Long Term Evolution (LTE) network, WiMAX network, 3G network, etc., utilizing a cellular base station 132. The third network is a personal area network, such as IrDA, wireless USB (universal serial bus), Bluetooth, Z-Wave (a home automation radio technology), ZigBee (i.e., the IEEE 802.15.4 standards), WiFi Direct (a peer-to-peer WiFi standard developed by the WiFi Alliance that enables devices to connect with each other without required a wireless access point), and other peer-to-peer WiFi-model variants. Other networks and network types may be supported, and one or more of the illustrated networks may be omitted.

The peer device 815 further includes a shared content management module 830 that manages access to the shared cache 140, distribution of shared cache content, and determines associations with other peer devices. The shared cache management engine 832 stores received content segments in the shared cache segment 840, which itself is a segment of the distributed shared cache 140. The shared cache management engine 832 may also poll peer devices to determine whether content is locally cached, and report stored content and/or content deletions to other devices that utilize the shared cache 140, and/or to the content server 110. If a NAS 842 is part of the system 100, the share cache management engine 842 may store cached content on the NAS 842 so that other devices using the shared cache 140 may access cached content directly from the NAS 842, which is locally accessible (i.e., can be accessed without leaving one of the local networks).

A distribution management engine 834 manages sharing stored content with other devices, such as determining a route from the device 815 to a device accessing the cached content (e.g., cache sharing 310, 512, 524, 612, 624) based on topological awareness data generated by a device associations engine 838. This topological awareness data may be modelled as weighted graph, with the distribution management engine 834 executing the constraints-based weighted graph optimization to determine least-cost routes.

The device associations engine 838 may determine what peer devices that share cache content are nearby, polling the devices across one or more of the local networks (e.g., peer-to-peer, peer-to-mesh, peer to local router to peer) to determine local connectivity, connection speed, and connection latency. The device associations engine 838 may report topological awareness connectivity to the content server 110, and to other peer devices that are part of the mesh (e.g., as a table). Topological awareness data may be collected periodically by the device association engine 838, in response to detected changes in a network environment, in response to a request from a distribution management engine 834 (on the same device or a different device), or when queried by the device associations engine 738 of the server. Devices associations received from different devices and/or servers may be combined by the individual device associations engines 838 of the peer device 815 to generate the topological awareness data used by the distribution management engine 834, and/or a network topological awareness for the system 100 may be distributed by the device associations engine 738 of the content server 110.

The device associations engine 838 of a peer device may be configured to include additional information in the topological routing information, such as calculating the number of network routing "hops" to each peer device. In computer networking, a "hop" is one portion of the path between source and destination. Data packets pass through routers and gateways on the way. Each time packets are passed to the next device, a "hop" occurs. To see how many hops it takes to get from one host to another ping, traceroute, tracepath, etc. commands can be used. Such commands (although the command name and output may vary) are available in most modern operating system. Provided as standard diagnostic tools, such commands may be called by software applications to measure, among other things, transit delays of packets on an Internet Protocol (IP) network. The same or similar commands may also be supported at an operating system level on cellular network devices.

The determination of the number of hops to the peer devices may include the device associations engine 838 leveraging connections outside of the local networks, such as connections over the first network (121) and the second network (122), and may be used when calculating arc "weights" for communications connection (e.g., increasing the weight of a graph arc corresponding to a connection traversing the hops to compensate for the increased unpredictability in network speed and latency over time introduced with each additional hop). If a purely local mesh or peer-to-peer network connection (e.g., via a wired or wireless LAN or a PAN) to a target device is not available, and the number of hops is below a threshold value, a distribution management engine 834 may leverage relatively short-haul connections over the long-haul networks (121, 122).

For example, the peer devices of two users that are next-door neighbors may connect to a cable network and/or Internet service provider (ISP) that routes all of their traffic through a same local exchange router. If the two neighbors' devices communicate through the local exchange router, the data rate may be considerably higher than the rate available over the larger network, even if typically slower than the speed available via a LAN (although, depending upon the PAN protocol and proximity of peer devices, sometimes faster than the speed available via a PAN). Similar situations may arise on a cellular telecommunications network, where the connections between two cellular subscriber devices are relayed by a local packet gateway. While such connectivity across the edges of a long-haul network do not constitute a local area network (LAN) connection, they may optionally be used for cache sharing.

However, devices connected across a LAN network typically connect within a shared security environment. For example, a WLAN router 131 ordinarily has a firewall between itself and the larger external network (i.e., 121). Inter-device communications through the router 131 occur inside that security firewall. In comparison, communicating through a local exchange crosses across the firewall, entering the less secure "wilds" of the larger network. Therefore, the security (e.g., encryption) used to communicate shared cache data outside the LAN/PAN environment may be increased relative to the security used within the LAN/PAN environment.

Routing information determined when measuring hops may also include the network address of each router or gateway along the path. Addresses such as IP address are ordinarily grouped, with local devices sharing all but the least significant part of the address. An analogy is how the home addresses of neighbors have the same country, state/province, and city/town, with the variation being in unit/house number. It is advantageous to minimize the number and significance of group address changes, as such changes are usually indicative of decreased performance (due to communications crossing through more network gateways). Returning to the neighbors' analogy, if a piece of physical mail were tracked to the local post office and back, there might only be one significant change of address (e.g., no change of city/town, but change of street). On the other hand, if the letter is sent from the local post office to an out-of-state mail sorter before coming back (in addition to indicating more hops), that would reflect multiple and more significant address changes along the path of the letter, and generally be an indicator of slower mail delivery. Thus, if comparing two routes with the same number of hops, the distribution management engine 734 of the server 110 and/or distribution management engine 834 of a peer device 112 may preferentially select a route based on the number of hops and on the number and significance of changes in network addresses.

The concepts disclosed herein may be applied within a number of different devices and computer systems, including, for example, general-purpose computing systems, multimedia set-top boxes, "smart" televisions, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, edge computing, and mesh networking should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of module 730 and module 830 may be implemented as firmware or as a state machine in hardware. For example, the shared cache management engine 832 may be implemented as an application specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   determining, by a content server during a first time period, that first content is likely to be accessed by a first mobile device during a second time period later than the first time period;
   determining a first amount of time until the first mobile device is expected to access the first content;
   determining a data rate of a connection over a first network between the content server and the first mobile device;
   determining that a size of the first content divided by the data rate is greater than the first amount of time;
   identifying, by the content server, a second mobile device, where the second mobile device is identified as having had a previous connection with the first mobile device via a local wireless network;
   transmitting, based at least part on determining the second time period, a first portion of the first content to the first mobile device via the first network without receiving, from the first mobile device, a request for transmission of the first content; and
   transmitting, by the content server, based on determining that the size of the first content divided by the data rate is greater than the first amount of time, a second portion of the first content to the second mobile device via a second network.

2. The method of claim 1, wherein the local wireless network is a peer-to-peer connection comprising a direct wireless connection between the first mobile device and the second mobile device.

3. A method comprising:
   determining, by a content server during a first time period, that first content is likely to be accessed by a first device during a second time period later than the first time period;
   determining a first amount of time until the first device is expected to access the first content;
   determining that a transmission duration of the first content is greater than the first amount of time;
   transmitting, based at least in part on determining that the first content is likely to be accessed by the first device, a first portion of the first content to the first device via a first network at a first data rate without receiving, from the first device, a request for transmission of the first content;
   identifying a second device that has had previous communication with the first device, the previous communication occurring via a second network, the first device and the second device configured to share storage, and the second network associated with a second data rate that is faster than the first data rate; and
   transmitting, based at least in part on determining that the transmission duration of the first content is greater than the first amount of time, a second portion of the first content from the content server to the second device via a third network.

4. The method of claim 3, further comprising:
   determining, based on past communication information between the first device and the second device, a third time period when the second device is expected to communicably couple with the first device via the second network;
   determining, based on a pattern of content consumption and device usage of the first device, a fourth time period when the first content is likely to be accessed via the first device; and
   determining that the fourth time period is later than the third time period,
   wherein the transmitting of the second portion of the first content to the second device based on determining that the fourth time period is later than the third time period.

5. The method of claim 3 further comprising:
   determining, by the content server, second content for delivery to the second device, the second content being different than the first content; and
   transmitting, by the content server, a first portion of the second content to the first device.

6. The method of claim 3, wherein:
   determining the first amount of time is based at least in part on at least one of a past content consumption of a first user of the first device and usage of the first device by the first user, and
   determining the transmission duration comprises determining that a size of the first content divided by the first data rate is greater than the first amount of.

7. The method of claim 3, further comprising:
   transmitting a third portion of the first content from the content server to the first device via a fourth network that is different than the first network,
   wherein the first network is the Internet and the fourth network is a cellular communications data network.

8. The method of claim 3, further comprising:
   determining, prior to transmitting the second portion, that the second device has available storage capacity to store the second portion of the first content.

9. The method of claim 3, further comprising:
   identifying a third device that has had previous communication with the first device, the previous communication occurring via a fourth network, the first device and the third device configured to share storage, and the fourth network associated with a third data rate that is faster than the first data rate; and
   transmitting the second portion of the first content from the content server to the third device over a fifth network.

10. The method of claim 3, further comprising:
    identifying a third device that has had previous communication with the first device, the first device and the third device configured to share storage;
    determining that available storage on the third device is not large enough to store the second portion of the first content, prior to transmitting the second portion to the second device; and
    determining, at the content server, that the third device is able to connect to the second device,
    wherein transmitting of the second portion of the first content to the second device comprises transmitting the second portion to the second device through the third device, transmission of the second portion between the content server and the third device being via the third network.

11. The method of claim 10, further comprising:
    receiving, at the content server, a list of devices to which the third device is able to connect,
    wherein determining that the third device is able to connect to the second device is based on the list.

12. A non-transitory computer-readable storage medium storing processor-executable instructions to configure a content server to:
- determine, during a first time period, that first content is likely to be accessed by a first device during a second time period later than the first time period;
- determine a first amount of time until the first device is expected to access the first content;
- determine that a transmission duration of the first content is greater than the first amount of time;
- transmit, based at least in part on determining that the first content is likely to be accessed by the first device, a first portion of the first content to the first device via a first network at a first data rate without receiving, from the first device, a request for transmission of the first content;
- identify a second device that has had previous communication with the first device, the previous communication occurring via a second network, the first device and the second device configured to share storage, and the second network associated with a second data rate that is faster than the first data rate; and
- transmit, based at least in part on determining that the transmission duration of the first content is greater than the first amount of time, a second portion of the first content to the second device via a third network.

13. The non-transitory computer-readable storage medium of claim 12, further comprising processor-executable instructions that further configure the content server to:
- determine, based on past communication information between the first device and the second device, a third time period when the second device is expected to communicably couple with the first device via the local network; and
- determine, based on a pattern of content consumption and device usage of the first device, a fourth time period when the first content is likely to be accessed via the first device; and
- determine that the fourth time period is later than the third time period,
- wherein the content server is configured to transmit the second portion of the first content to the second device in response to the determination that the fourth time period is later than the third time period.

14. The non-transitory computer-readable storage medium of claim 12, further comprising processor-executable instructions that further configure the content server to:
- determine second content for delivery to the second device, the second content being different than the first content; and
- transmit a first portion of the second content to the first device.

15. The non-transitory computer-readable storage medium of claim 12, further comprising processor-executable instructions further that configure the content server to:
- determine that the first amount of time based at least in part on at least one of a past content consumption of a first user of the first user and usage of the first device by the first user; and
- determine the transmission duration based at least in part on determining that a size of the first content divided by the first data rate is greater than the first amount of time.

16. The non-transitory computer-readable storage medium of claim 12, further comprising processor-executable instructions that further configure the content server to:
- transmit a third portion of the first content to the first device via a fourth network that is different than the first network,
- wherein the first network is the Internet and the fourth network is a cellular communications data network.

17. The non-transitory computer-readable storage medium of claim 12, further comprising processor-executable instructions that further configure the content server to:
- determine, prior to the transmission of the second portion, that the second device has available storage capacity to store the second portion of the first content.

18. The non-transitory computer-readable storage medium of claim 12, further comprising processor-executable instructions that further configure the content server to:
- identify a third device that has had previous communication with the first device, the previous communication occurring via a fourth network, the first device and the third device configured to share storage, and the fourth network associated with a third data rate that is faster than the first data rate; and
- transmit the second portion of the first content from the content server to the third device over a fifth network.

19. The non-transitory computer-readable storage medium of claim 12, further comprising processor-executable instructions that further configure the content server to:
- identify a third device that has had previous communication with the first device, the first device and the third device configured to share storage;
- determine that available storage on the third device is not large enough to store the second portion of the first content, prior to the transmission of the second portion to the second device; and
- determine that the third device is able to connect to the second device,
- wherein transmission of the second portion of the first content to the second device is through a third device, communication between the content server and the third device being via the third network.

* * * * *